UNITED STATES PATENT OFFICE.

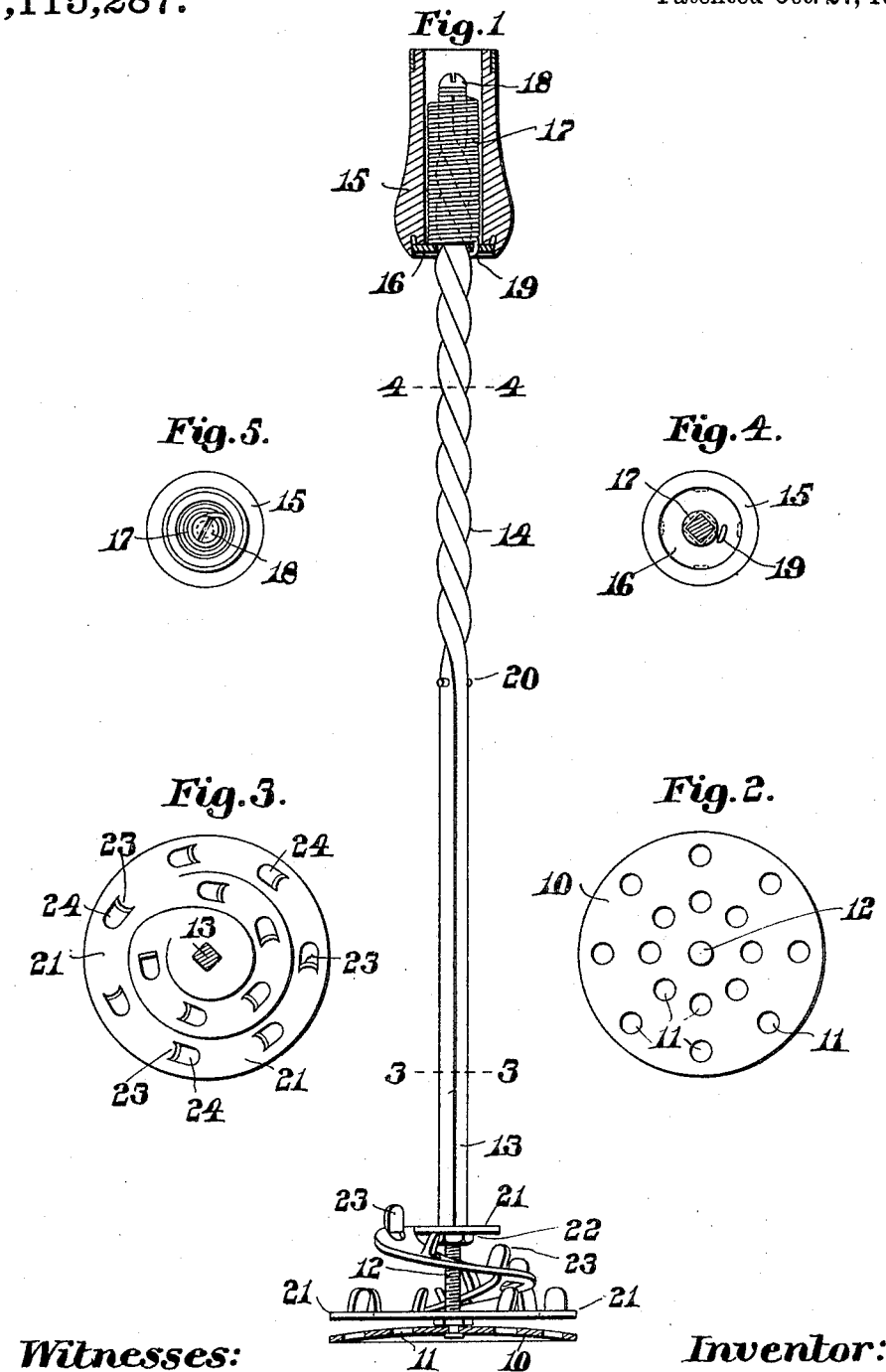

JOSEPH D. COUGHLIN, OF DORCHESTER, MASSACHUSETTS, ASSIGNOR, BY MESNE ASSIGNMENTS, TO PROGRESSIVE MANUFACTURING COMPANY, OF BOSTON, MASSACHUSETTS, A CORPORATION.

EGG-BEATER.

1,115,287.  Specification of Letters Patent.  Patented Oct. 27, 1914.

Application filed October 6, 1913. Serial No. 793,752.

*To all whom it may concern:*

Be it known that I, JOSEPH D. COUGHLIN, a citizen of the United States of America, and a resident of Dorchester, in the county of Suffolk and State of Massachusetts, have invented certain new and useful Improvements in Egg-Beaters, of which the following is a specification.

This invention relates to egg beaters and devices of a similar nature adapted to be used to mix liquid and semi-liquid food substances, and has for its object the production of a device which will be effective in operation and at the same time may be cheaply constructed.

The invention consists of certain novel features of construction and arrangement of parts which will be fully understood by reference to the description of the drawings and to the claims hereinafter given.

Of the drawings: Figure 1 represents an elevation, partially in section, of a beater embodying the features of the present invention. Fig. 2 represents an inverted plan of the same. Fig. 3 represents a horizontal section of the same, looking downwardly, the cutting plane being on line 3—3 on Fig. 1. Fig. 4 represents a horizontal section of the same looking upwardly, the cutting plane being on line 4—4 on Fig. 1, and Fig. 5 represents a plan of the upper end of the same.

Similar characters designate like parts throughout the several figures of the drawings.

In the drawings, 10 is a base plate preferably curved upwardly, as indicated in Fig. 1 of the drawings. This plate is provided with a plurality of perforations 11 therethrough through which the material is adapted to pass when the device is being positioned in a receptacle containing a substance or substances to be stirred or mixed. This base plate 10 is so riveted to the end of the threaded shank 12 of a squared rod 13 that said plate 10 and rod 13 are adapted to be revolved relative to one another, while the separation of the plate from the shank is prevented.

The upper end of the rod 13 is twisted as indicated at 14. Mounted upon the upper end of the twisted portion 14 is a reciprocating member or handle 15 having secured to its lower end a plate 16 provided with a central square perforation 17 fitting the twisted portion of the rod 13. It is obvious that when the handle 15 is grasped in the hand and reciprocated lengthwise of the rod 13 the perforated disk 16 will act upon the twisted portion 14 of the rod 13 to rotate it in one direction during the downward movement of said handle and in the opposite direction during its return movement. Normally the handle 15 is positioned around the upper end of the threaded portion 14 of the rod 13, being held in this position by means of the spring 17, one end of which is secured to the upper end of the rod 13 by means of the screw 18, while the lower end is secured to the disk 16 at 19. The downward movement of the handle 15 is limited by stop pins 20. The threaded shank 12 extends through a central perforation in the flat conical spiral member 21 the central portion of which is clamped to the rod 13 by means of a nut 22. This spiral member 21 is provided with a plurality of upwardly extending projections 23 at the base of each of which is a perforation 24 through which the material being mixed is adapted to pass while the member 21 is being oscillated. When the base of the device is being placed in the cup or saucer the material contained therein is adapted to freely pass through the perforations 11 in the base plate 10.

When the base plate has been positioned in the bottom of the receptacle the operator grasping the handle 15 reciprocates the same along the twisted portion 14 of the rod 13. This causes the rod 13 to be oscillated about its axis moving the spiral mixing member 21 first in one direction and then the other. Owing to the shape of this mixing member 21 and the projections 23 thereon, the food substances in the receptacle are thoroughly mixed during the oscillations of the mixing member. This mixing is facilitated by means of a plurality of upwardly extending projections acting against the food substances at different levels and by means of the perforations at the base of these projections through which the material is forced to pass during the oscillation of said member. This makes a very simple construction of egg beater which may be manufactured at very small expense, while at the same time it is very effectual in its operation.

It is believed that the operation and many advantages of the invention will be fully understood from the foregoing description.

Having thus described my invention, I claim:

1. In a device of the class described, the combination of a base plate; a member extending therefrom adapted to revolve relative thereto; means for revolving said member; and a conical spiral member secured to said member and provided with a plurality of substantially vertical projections.

2. In a device of the class described, the combination of a perforated base plate; a member extending therefrom adapted to revolve relative thereto; means for revolving said member; and a flat conical spiral member secured to said member and provided with a plurality of substantially vertical projections.

3. In a device of the class described, the combination of a base plate; a member extending therefrom adapted to revolve relative thereto; means for revolving said member; and a perforated flat conical spiral member secured to said member and provided with a plurality of projections extending from the flat face thereof at the edges of said perforations.

4. In a device of the class described, the combination of a base plate; a revoluble member extending therefrom; means on said member for oscillating it about its axis; and a flat spiral member secured to said oscillating member having a plurality of upwardly extending projections.

5. In a device of the class described, the combination of a base plate; a revoluble member extending therefrom; means on said member for oscillating it about its axis; a flat spiral member secured to said oscillating member having a plurality of upwardly extending projections; and a perforation at the base of each projection.

6. In a device of the class described, the combination of a base plate; a squared rod revolubly mounted thereon and twisted at its upper end, said rod having a reduced threaded portion at its lower end; a flat conical spiral member mounted on said threaded portion and provided with a plurality of substantially vertical projections; a nut for clamping said spiral member to said revoluble member; and a reciprocating member on said twisted portion adapted to oscillate said revoluble member.

Signed by me at 4 Post Office Sq., Boston, Mass., this 4th day of October, 1913.

JOSEPH D. COUGHLIN.

Witnesses:
 WALTER E. LOMBARD,
 NATHAN C. LOMBARD.

---

Copies of this patent may be obtained for five cents each, by addressing the "Commissioner of Patents, Washington, D. C."